United States Patent [19]

Meckler

[11] Patent Number: 4,635,446

[45] Date of Patent: Jan. 13, 1987

[54] DEHUMIDIFICATION APPARATUS

[75] Inventor: Gershon Meckler, Bethesda, Md.

[73] Assignee: Camp Dresser & McKee, Boston, Mass.

[21] Appl. No.: 763,306

[22] Filed: Aug. 5, 1985

Related U.S. Application Data

[63] Continuation of Ser. No. 264,126, May 15, 1981, abandoned, which is a continuation-in-part of Ser. No. 49,592, Jun. 18, 1979, abandoned.

[51] Int. Cl.⁴ ............................................. F25D 21/00
[52] U.S. Cl. .................... 62/271; 62/235.1; 62/324.5; 62/236; 62/94
[58] Field of Search ............... 62/93, 94, 282, 324.5, 62/271, 235.1, 236, 324.1, 324.5; 237/2 B

[56] References Cited

U.S. PATENT DOCUMENTS

| | | | |
|---|---|---|---|
| 2,284,914 | 6/1942 | Miller | 183/4 |
| 2,672,024 | 3/1954 | McGrath | 62/6 |
| 2,690,656 | 10/1954 | Cummings | 62/176 |
| 3,064,952 | 11/1962 | Brown | 261/3 |
| 3,976,458 | 8/1976 | Krug | 62/236 |
| 4,197,713 | 4/1980 | Bulang | 62/94 |
| 4,205,529 | 6/1980 | Ko | 62/2 |
| 4,259,849 | 4/1981 | Griffiths | 62/271 |
| 4,293,092 | 10/1981 | Hatz et al. | 237/2 B |

FOREIGN PATENT DOCUMENTS 2633662 2/1978 Fed. Rep. of Germany ..... 62/238.6

*Primary Examiner*—Henry Bennett
*Attorney, Agent, or Firm*—John C. Purdue

[57] ABSTRACT

Apparatus for dehumidifying air is disclosed. The apparatus comprises a receiver for a hygroscopic liquid, a regenerator, a dehumidifier, a heat pump and means for circulating four different streams of the hygroscopic liquid. The heat pump has an energy input section, a heat collecting section and a heat rejecting section, and is operable, when the energy input section is energized, to transfer heat from the heat collecting section at a given temperature to the heat rejection section at a higher temperature. The apparatus has means for circulating the hydroscopic liquid: (1) in a first stream from the receiver into heat transfer relationship with the heat rejection section of the heat pump and then to the regenerator, where it is sprayed; (2) in a second stream from the regenerator to the receiver; (3) in a third steam from the receiver to the dehumidifier, where it is sprayed; and (4) in a fourth steam from the dehumidifier to the receiver. The apparatus also includes means for transferring heat of sorption therefrom, means for circulating air to be dehumidified through the dehumidifier, in contact with hygroscopic liquid, means for removing from the regenerator water vaporized from hygroscopic liquid therein, and means for transferring heat from the second stream of hygroscopic liquid to the heat absorbing section of the heat pump.

9 Claims, 13 Drawing Figures

DEHUMIDIFICATION APPARATUS

REFERENCE TO RELATED APPLICATION

This application is a continuation of application Ser. No. 264,126 filed 5/15/81 now abandoned which is a continuation-in-part of application Ser. No. 49,592, filed 6/18/79, now abandoned.

BACKGROUND OF THE INVENTION

Apparatus which uses a hygroscopic liquid such as a solution of lithium chloride, lithium bromide, ethylene glycol or the like to dehumidify air has been known for many years, and has found relatively wide application in certain special fields. Such apparatus, however, has been found to be comparatively inefficient from the standpoint of energy requirements when used in connection with air conditioning systems designed primarily to maintain comfort conditions for human occupants of buildings. The principal problem involves the necessity for expanding substantial amounts of energy to regenerate the hygroscopic liquid and the return to the system as a load, of a significant percentage of the energy required for regeneration. Apparatus which uses a solid desiccant such as silica gel, solid lithium chloride, activated alumina or the like similarly involved the necessity for expending substantial amounts of thermal energy for regeneration.

BRIEF DESCRIPTION OF THE PRESENT INVENTION

The present invention is based upon the discovery that a high temperature heat pump can be utilized in apparatus of the type in question to pump heat from the effluent from the regenerator to a stream of hygroscopic liquid being caused to flow to the regenerator, and that the heat required for regeneration can be supplied in this manner. The effluent from the regenerator serving as a heat source for the heat pump can be the regenerated hygroscopic liquid leaving the regenerator, can be a mixture of hygroscopic solution leaving the regenerator with hygroscopic solution from the dehumidifier, or can be the hot, humid mixture of air and water vapor that is normally vented from the regenerator and rejected from the system; in the last case, the effluent from the regenerator is caused to flow through a washer where comparatively cool water is sprayed in contact with the effluent so that a substantial portion of the heat, both sensible and latent, that would normally be vented from the system with the regenerator effluent is transferred to the water in the washer and that water is then used as the heat source for the heat pump. In either of the cases just described where the hygroscopic liquid itself is the heat source for the heat pump, one consequence of operation of the apparatus is the availability of a stream of the hygroscopic liquid at a temperature lowered as a consequence of the operation of the heat pump; this lowered temperature stream can be heated, thus introducing energy into the system, by heat from a comparatively low temperature source, for example water heated by solar energy or condenser water from conventional refrigeration apparatus. In another case, heat collected as a consequence of dehumidifying outside air can be used, after heat pumping, for regeneration of a desiccant which is used for further dehumidification.

DETAILED DESCRIPTION OF THE PREFERRED EMBODIMENTS

Figure 1:
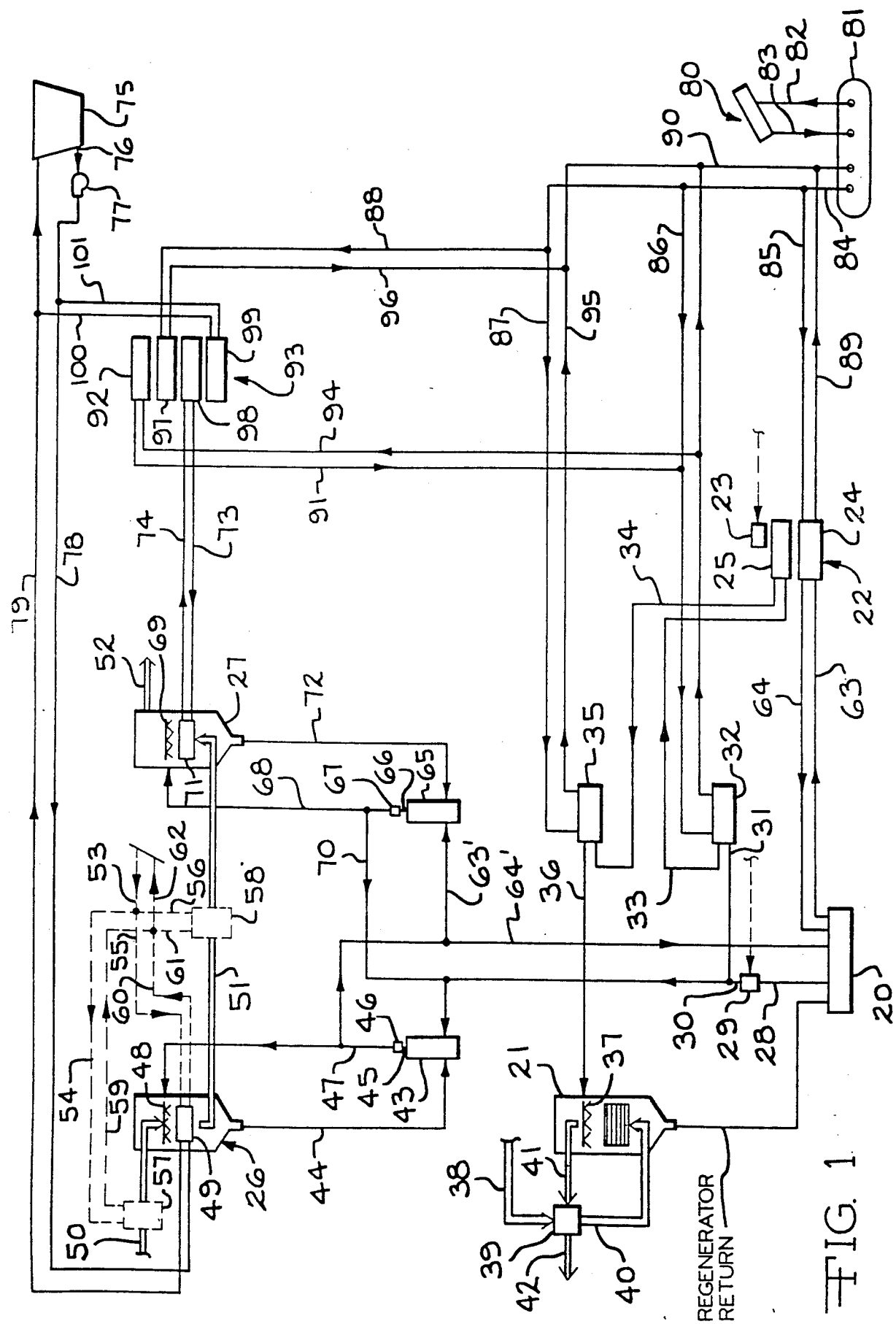
FIG. 1 is a partially schematic diagram of apparatus according to the invention which includes a receiver to which relatively concentrated hygroscopic liquid is caused to flow from a regenerator while relatively dilute hygroscopic liquid is caused to flow thereto from a dehumidifier and from which a stream of hygroscopic liquid is caused to flow to a dehumidifier while another stream of hygroscopic solution is caused to flow from the receiver to the heat absorbing section of a heat pump and from thence back to the receiver. The apparatus also includes a solar collector and absorption refrigeration apparatus.

Apparatus according to the invention for dehumidifying air is shown in FIG. 1. The apparatus comprises a receiver 20 for a hygroscopic liquid, a regenerator 21, a heat pump indicated generally at 22 having an energy input section 23, a heat absorbing section 24 and a heat rejection section 25 and a dehumidifier 26. The apparatus also includes a second dehumidifier 27 which is a desirable, but not essential, element.

In operation, the heat pump 22, when the energy input section 23 is energized, is operable to transfer heat from the heat absorbing section 24 at a given temperature to the heat rejection section 25 at a temperature higher than the given temperature.

In operation, a first stream of a hygroscopic liquid is caused to flow from the receiver 20 through a line 26 by a pump 29 and from thence through a line 30 and a line 31, an indirect heat exchanger 32, a line 33, the heat rejection section 25 of the heat pump 22, a line 34, an indirect heat exchanger 35 and a line 36 to the regenerator 21. Hygroscopic liquid flowing in the first stream is indirectly heated by the heat rejection section 25 of the heat pump 22 to a temperature sufficiently high that is capable of being regenerated. The heated hygroscopic liquid in the first stream, after reaching the regenerator 21, flows through sprays 37, and is sprayed within the regenerator 21, returning to the receiver 20 through a line identified by legend as a "Regenerator Return" line.

Air, preferably, relief air from a building served by the apparatus of FIG. 1 is caused to flow through a line 38, an indirect heat exchanger 39 and a line 40 and from thence upwardly through the regenerator 21, being discharged therefrom through a line 41, the indirect heat exchanger 39, and a line 42 for discharge from the apparatus.

Hygroscopic liquid pumped from the receiver 20 through the line 28, by the pump 29 and to the line 30 is also delivered to a receiver 43 where it is mixed with hygroscopic solution returning to the receiver 43 through a line 44 from the dehumidifier 26. Hygroscopic solution from the receiver 43 is pumped through a line 45 by a pump 46 and from thence through a line 47 to sprays 48 within the dehumidifier 26 from which it is sprayed downwardly over a heat exchanger 49 and in contact with air which enters the dehumidifier 26 through a line 50, and leaves through a line 51. As shown in FIG. 1, air leaving the dehumidifier 26 through the line 51 enters the dehumidifier 27 where it is further conditioned as subsequently described in more detail before being delivered to a space to be conditioned through a line 52. The apparatus of FIG. 1 can also be operated without the dehumidifier 27 by circulating chilled water from a source (not illustrated) through a line 53 and lines 54, 55 and 56 to a coil 57, to the coil 49 and to a coil 58, respectively and from the coils through lines 59, 60 and 61, back to a return line 62 to the chiller (not illustrated). In this mode of operation, air entering the dehumidifier 26 through the line 50 is cooled as it flows in contact with the coil 57; hygroscopic solution flowing over the heat exchanger 49 is also cooled, as is air leaving the dehumidifier 26 through the line 51 by contact with the coil 58. As a consequence, the air flowing into the dehumidifer 27 from the line 51 can be at a desired condition of dry bulb temperature and humidity, and can be discharged from the line 52 under the same conditions, without use of the dehumidifier 27.

The heat absorbing section 24 of the heat pump 22 receives heat from hygroscopic solution which is caused to flow (for example by a pump, not illustrated) from the receiver 20 through a line 63 into indirect heat exchange relationship with the heat absorbing section 24. Cooled hygroscopic solution flows back to the receiver 20 from the heat absorbing section 24 through a line 64.

It is usually preferred, in operating the apparatus of FIG. 1, to use the dehumidifier 27. This is done by diverting, through a line 63', a portion of a stream of hygroscopic solution flowing through a line 64 from the line 47 back to the receiver 20, into a receiver 65. Hygroscopic solution is circulated from the receiver 65 through a line 66 by a pump 67 and from thence through a line 68 to sprays 69 within the dehumidifier 27 and through a line 70 to the line 30 and the receiver 43. Hygroscopic solution is sprayed from the sprays 69 within the dehumidifier 27, flowing over a coil 71 and from the dehumidifier 27 through a line 72 back to the receiver 65. When the dehumidifier 27 is used, as just described, chilled water is circulated to the coil 71 from a line 73, and returned from the coil 71 through a line 74 as subsequently described in more detail.

When the dehumidifier 27 is employed in operating the apparatus of FIG. 1, chilled water is not supplied to the coils 49, 57 and 58, as previously described, but, instead, water from a cooling tower 75 is circulated through a line 76 by a pump 77 and from thence through a line 78 to the coil 49, returning to the coiling tower 75 through a line 79.

Operation of the apparatus of FIG. 1 in the manner just described, using both the dehumidifiers 26 and 27 is preferred in most cases because a major portion of the heat of sorption and of heat introduced into the receiver 20 from the regenerator 21 can be rejected in the cooling tower 75 with only a minimal expenditure of energy.

The portions of the apparatus of FIG. 1 which have thus far been described are also incorporated in the apparatus of FIGS. 2 through 8, and can operate in the same manner, and with the same options. Accordingly, these portions of the apparatus of FIGS. 2 through 8 will not be described further herein; they will merely be designated by the reference numerals used above, and the differences between the portions of the FIG. 1 apparatus which have not yet been described and the corresponding portions of those of FIGS. 2 through 8 will be explained.

Referring again to FIG. 1, the apparatus also incudes a solar collector indicated generally at 80. Water is circulated between the solar collector 80 and a hot water storage tank 81, flowing through lines 82 and 83. Water from the storage tank 81 is also circulated through a line 84 to a line 85, to a line 86 or to lines 87 and 88, depending upon the temperature of the water within the storage tank 81. When the water within the tank 81 is at a comparatively low temperature it can be circulated through the lines 84 and 85 to the heat absorbing section 24 of the heat pump 22 and from thence back through lines 89 and 90 to the storage tank 81. In this mode of operation, no water is circulated from the tank 81 to either of the lines 86 and 87. Water at an intermediate temperature in the storage tank 81 can be circulated through both of lines 85 and 86, in part to the heat absorbing section 24 of the heat pump 22 and in part to the indirect heat exchanger 32. The line 82 is connected by a line 91 to a condenser 92 of absorption refrigeration apparatus 93, so that water from the condenser 92 can flow through the line 91 and the line 86 to the heat exchanger 32, returning to the condenser 92 through a line 94. When there is an ample quantity of sufficiently hot water in the storage tank 81, operation of the heat pump 22 is unnecessary, as hot water can merely be circulated through the lines 84 and 87 to the indirect heat exchanger 35, returning through a line 95, and through the line 88 and a line 96 to and from a concentrator 97 of the absorption apparatus 93. All of the energy required for regeneration and to drive the absorption refrigeration apparatus 93 is supplied from the storage tank 81. In this mode of operation, solar energy is the sole source for regeneration and the absorption refrigeration apparatus 93. Although a substantial heat load is imposed upon the apparatus by hot, concentrated hygroscopic solution flowing into the receiver 20 from the regenerator return line, most of this load is rejected from the apparatus in the cooling tower 75 so that only a minimum of energy is required to operate the aparatus, and most of that is derived from solar energy.

The apparatus shown in FIG. 2 includes all of the elements shown in FIG. 1 and, in addition, a motor generator indicated generally at 102 and associated lines for coolant flow, valves and the like, as explained hereinafter. The motor generator 102 comprises a generator 103 and a combustion engine 104 operatively connected in driving relationship therewith. The engine 104 can be of the internal combustion type, e.g., a diesel or a spark ignited engine, or can be of the external combustion type, e.g., a stirling engine. Power from the generator 103, as indicated by a dashed line 105, is supplied to the heat pump 22, as indicated by a dashed line 106 and to the pump 29 as indicated by a dashed line 107. When the solar collector 80 furnishes an ample supply of sufficiently hot water in the storage tank 81, the apparatus of FIG. 2 can operate in the manner described above in connection with FIG. 1, without using the motor generator 102, and relying upon a utility for power to drive the heat pump 22 and the pump 107. When, however, the heat from the solar collector 80 is insufficient the motor generator 102 is energized by starting the internal combustion engine 104, a pump 108 is energized, a valve 109 is opened and a valve 110 is closed so that coolant is circulated through a line 111 to the cooling jacket (not illustrated) of the internal combustion engine 104 and through a line 112 to the line 87 through which it flows to and through the indirect heat exchanger 35 and from thence through the line 95 to a line 113 and back to the pump 108. Hot water from the storage tank 81, in this mode of operation of the apparatus shown in FIG. 2, can be used as described above in connection with FIG. 1.

Figure 3:
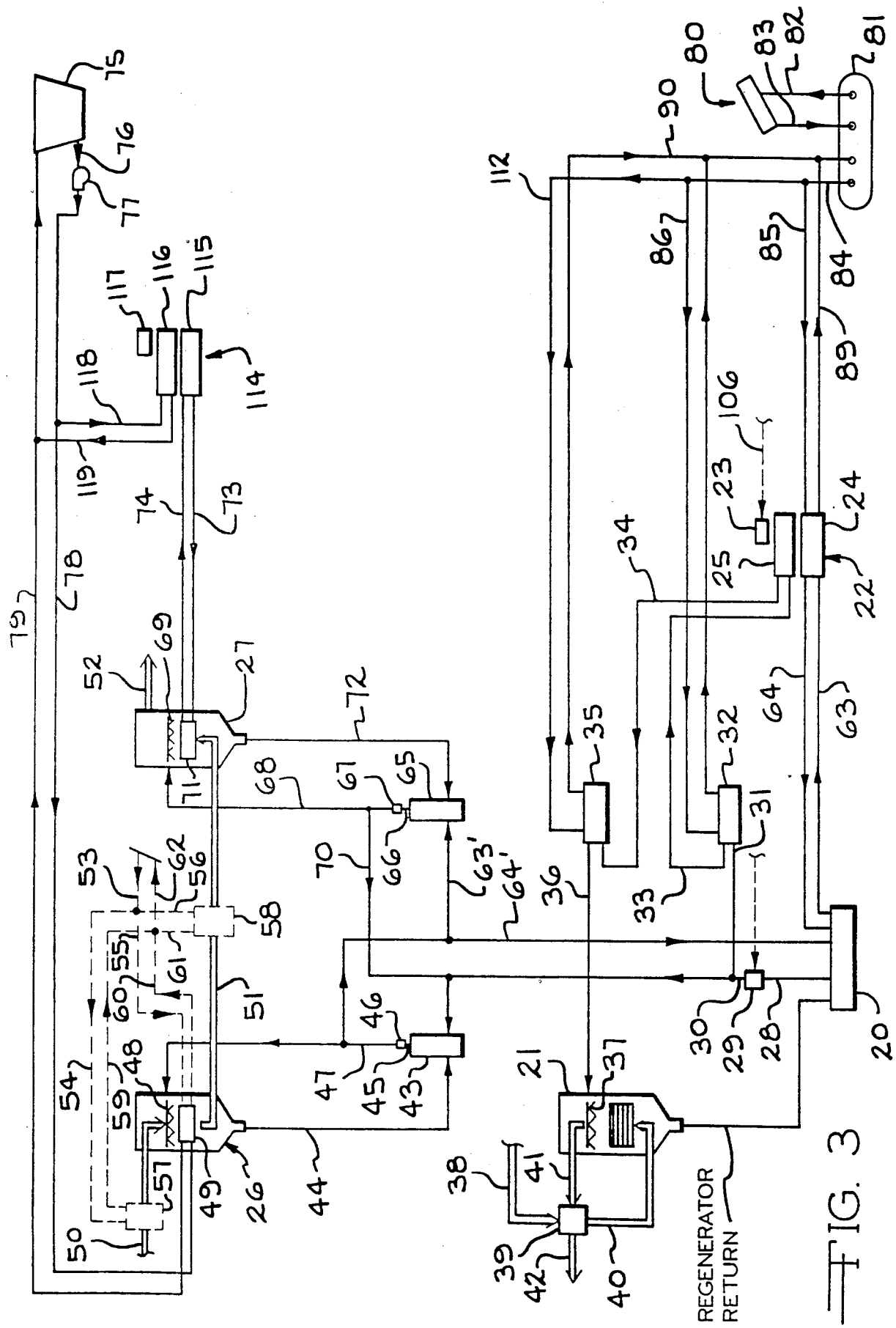
FIG. 3 is a partially schematic view of apparatus similar to that of FIG. 1, with the exception that conventional refrigeration apparatus of the compressor-condenser-evaporator type has been substituted for the absorption refrigeration apparatus.

The apparatus shown in FIG. 3 is similar to that of FIG. 1, the only difference being that the absorption refrigeration apparatus 93 has been replaced in the FIG. 3 apparatus by refrigeration apparatus indicated generally at 114, and comprising an evaporator 115, a condenser 116 and a compressor 117. The apparatus 114, like the apparatus 22 and the absorption apparatus 93, functions as a heat pump. Water from the coil 71 is circulated through the line 84 to the evaporator 115 where it is chilled, and is then returned through the line 73 to the coil 71. Cooling water is circulated from the line 78 through a line 118 to the condenser 116, while return water from the condenser 116 flows through a line 119 to the line 79.

The operation of the portion of the apparatus of FIG. 3 which is associated with the solar collector 80 is the same as the operation of that portion of the apparatus of FIG. 1, with the exception that heated water from the storage tank 81 supplies heat only for use in regeneration of the hygroscopic solution since the apparatus does not include the absorption refrigeration apparatus of FIG. 1.

Figure 2:
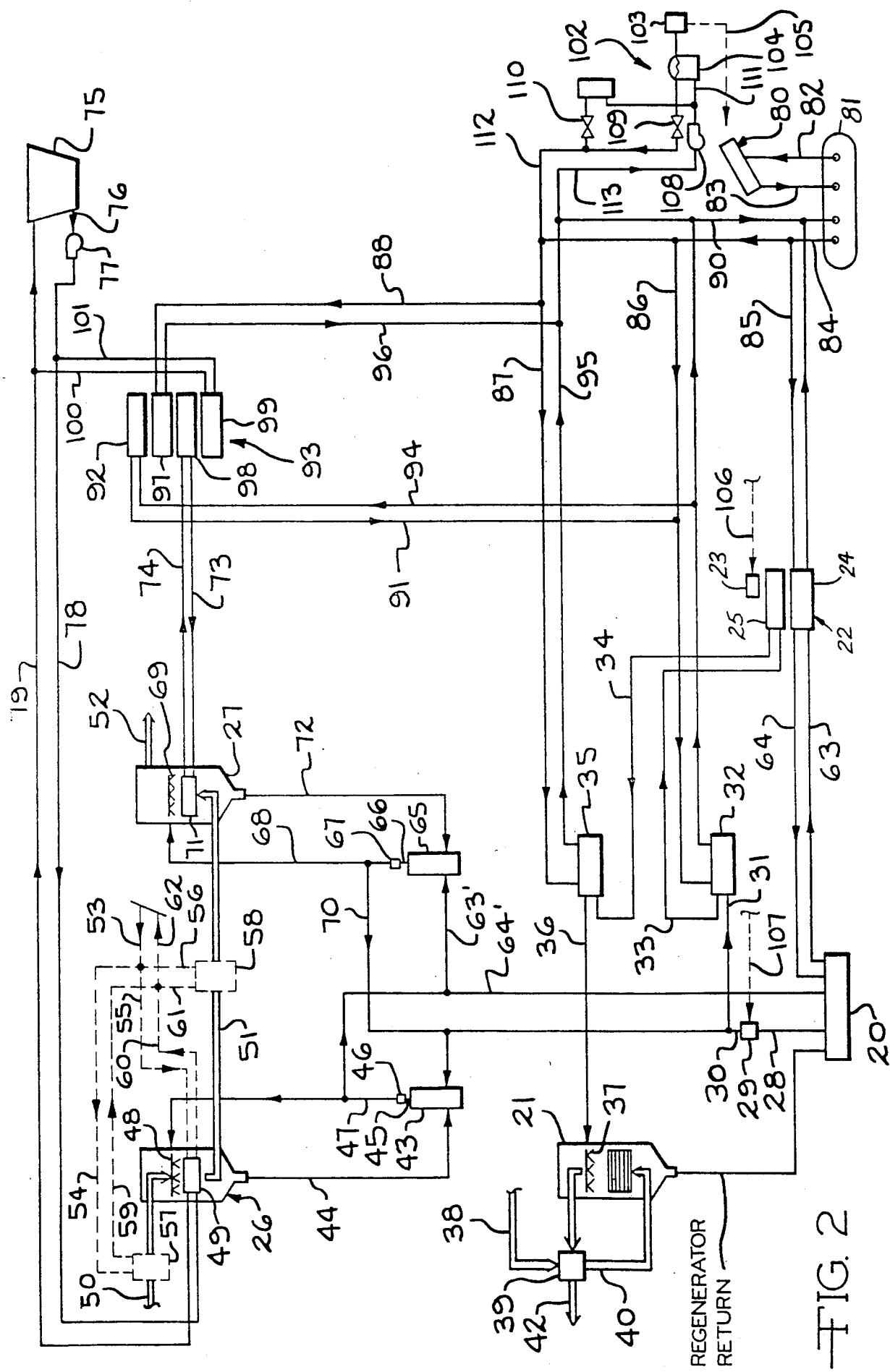
FIG. 2 is a partially schematic view similar to FIG. 1 showing apparatus which additionally includes an electric generator driven by an internal combustion engine to supply electric energy to drive the heat pump and a heated fluid which can be used as an energy source for the absorption refrigeration apparatus, for regeneration of hygroscopic liquid, or both.
Figure 4:
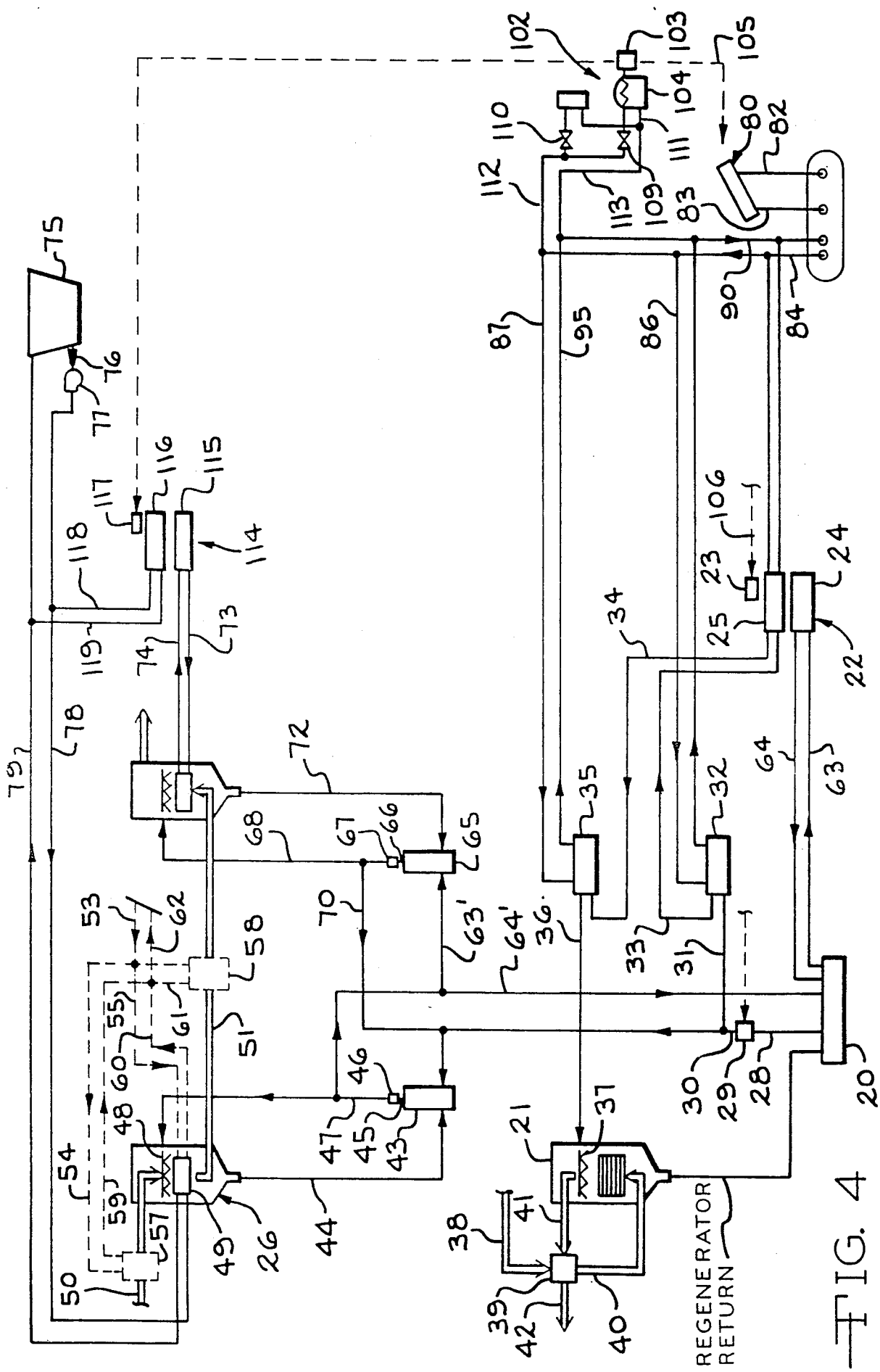
FIG. 4 is a partially schematic view of apparatus similar to that shown in FIG. 3, with the exception that an electric generator has been added, together with an internal combustion engine to drive the generator and to furnish a heated fluid for use in connection with the regeneration of hygroscopic liquid.

FIG. 4 is essentially a combination of FIGS. 2 and 3, including the motor generator 102 and the refrigeration apparatus 114. It will be appreciated that the refrigeration apparatus 114 is a heat pump, and that the absorption refrigeration machine 93 of FIGS. 1, 2, 5, 11, 12 and 13 is also a heat pump, both performing a function similar to that of the heat pump 22 of FIGS. 1–12. Since the FIG. 4 apparatus does not include an absorption refrigeration machine, heat from the engine 104 is used only for regeneration of the hygroscopic solution. As indicated by a dashed line 120, electrical energy from the generator 103 is used to drive the compressor 117 of the refrigeration apparatus 114.

Figure 5:
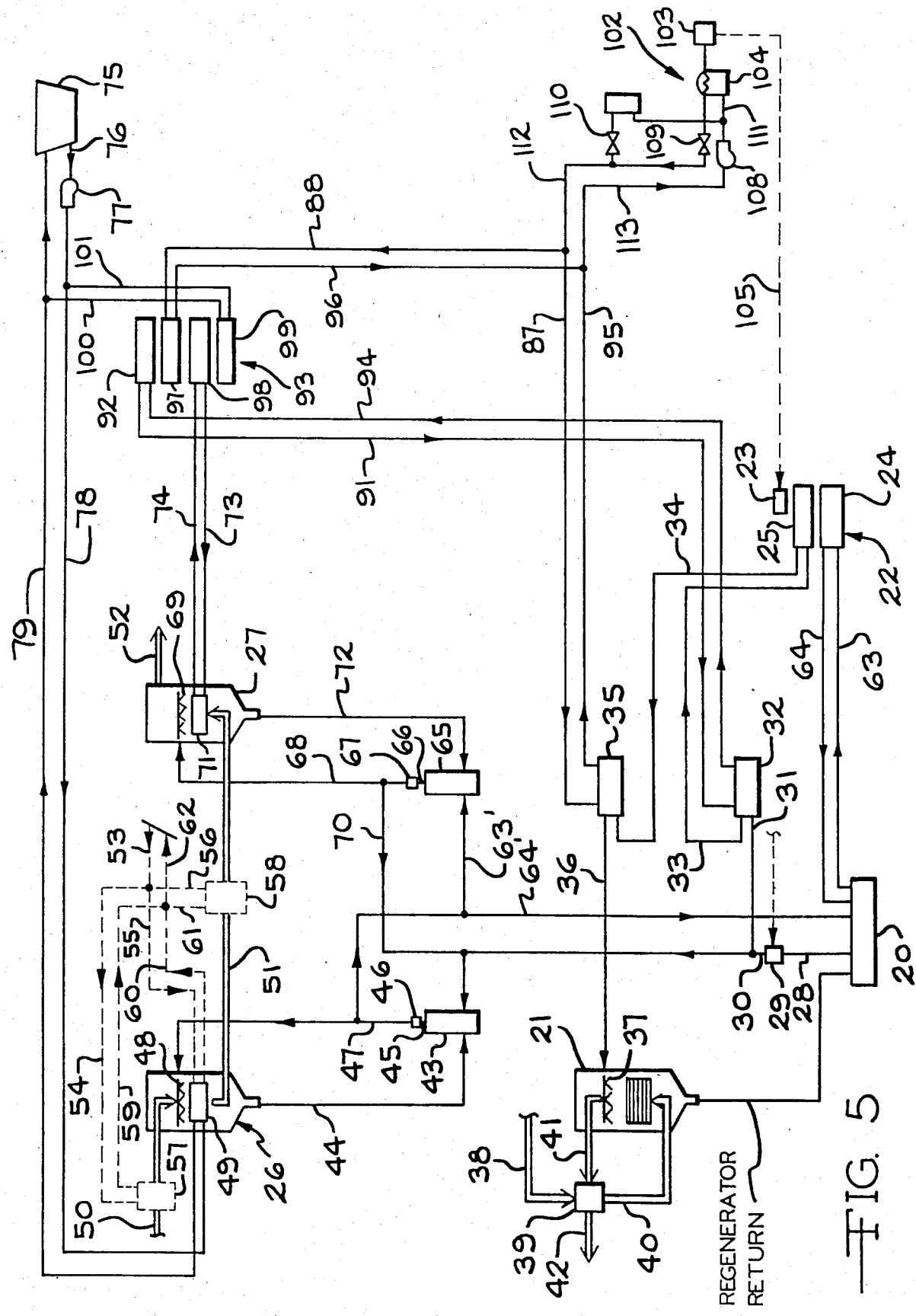
FIG. 5 is a partially schematic diagram showing apparatus similar to that of FIG. 2, with the exception that the solar collector has been eliminated.

The apparatus of FIG. 5 is substantially identical, and substantially identical in operation, to the apparatus of FIG. 2, with the exception that the solar collector 80, the storage tank 81 and associated piping, and their functions, have been eliminated. Heat from the internal combustion engine 104 is used both for regeneration of the hygroscopic solution and to furnish energy to the concentrator 97 of the absorption refrigeration apparatus 93.

Figure 6:
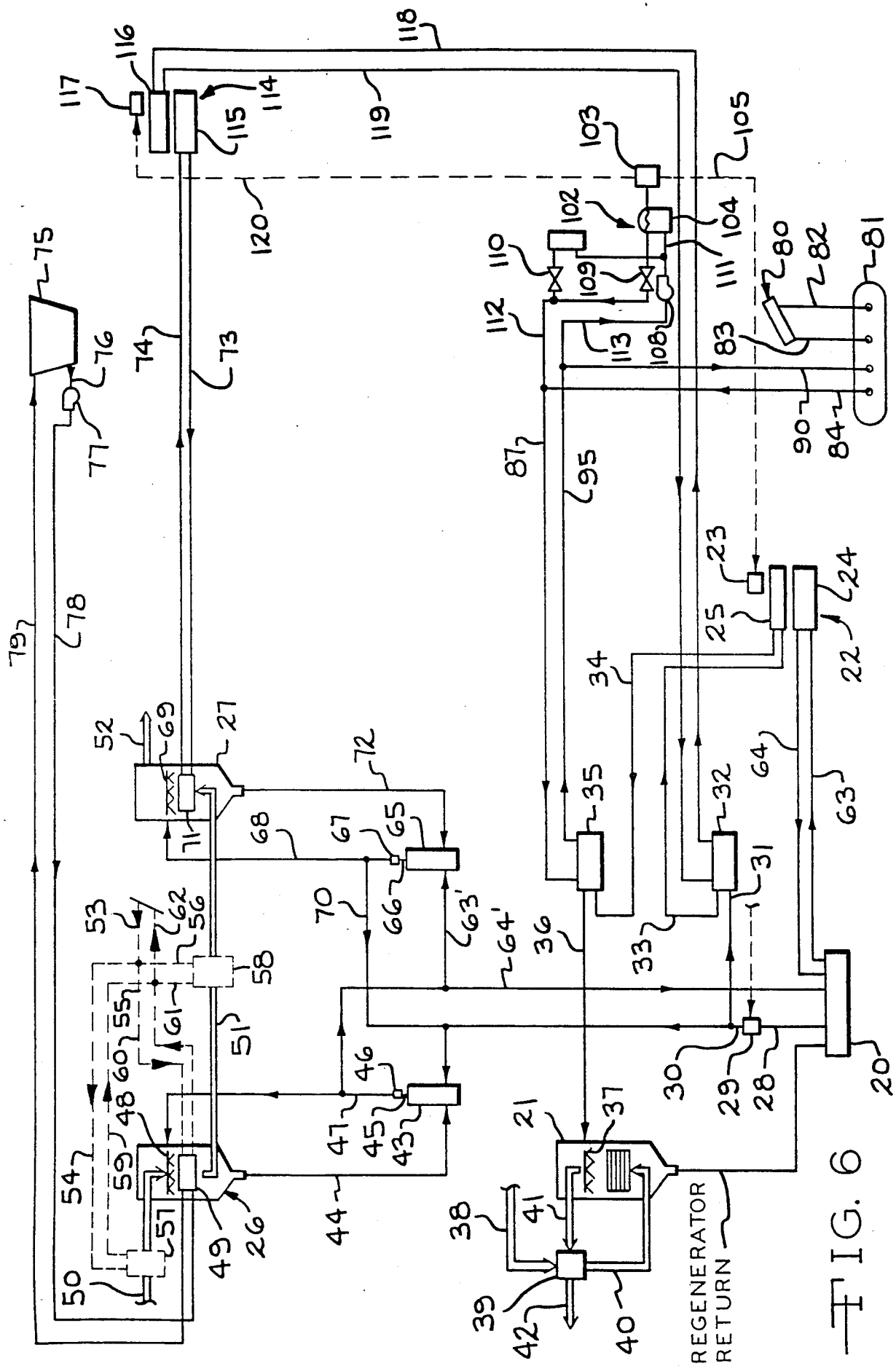
FIG. 6 is a partially schematic diagram showing apparatus similar to that of FIG. 4, but wherein heat removed from the condenser of refrigeration apparatus is used as an energy source in connection with the regeneration of hygroscopic solution.

The apparatus shown in FIG. 6 is similar to that of FIG. 4, with the following exceptions: (1) the lines connecting the storage tank 81 with the heat absorbing section 24 of the heat pump 22 have been eliminated; (2) the lines connecting the storage tank 81 with the indirect heat exchanger 32 have been eliminated; and (3) the lines 118 and 119 have been connected with the indirect heat exchanger 32 so that heat from the condenser 116 of the refrigeration apparatus 114 is transferred to hygroscopic solution in the indirect exchanger 32.

Figure 7:
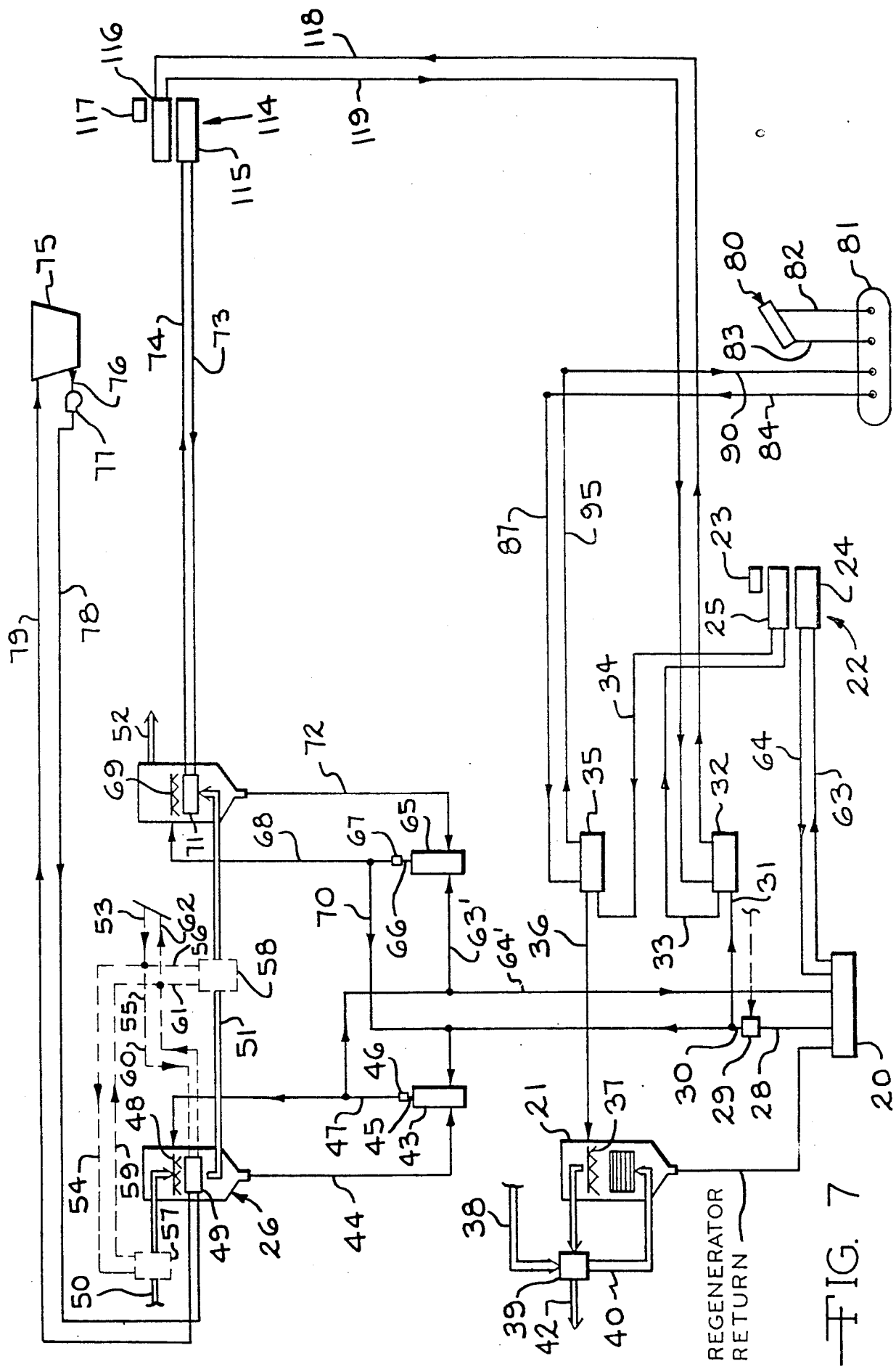
FIG. 7 is a partially schematic diagram showing apparatus similar to that of FIG. 6, but modified by the elimination of the electric generator and of the internal combustion engine drive therefor.

The apparatus of FIG. 7 and its operation are identical to those of FIG. 6, with the exception that the motor generator 102 and its function have been eliminated. Instead, the apparatus of FIG. 7 relies upon a utility for its energy requirements beyond those furnished by the solar collector 80.

Figure 8:
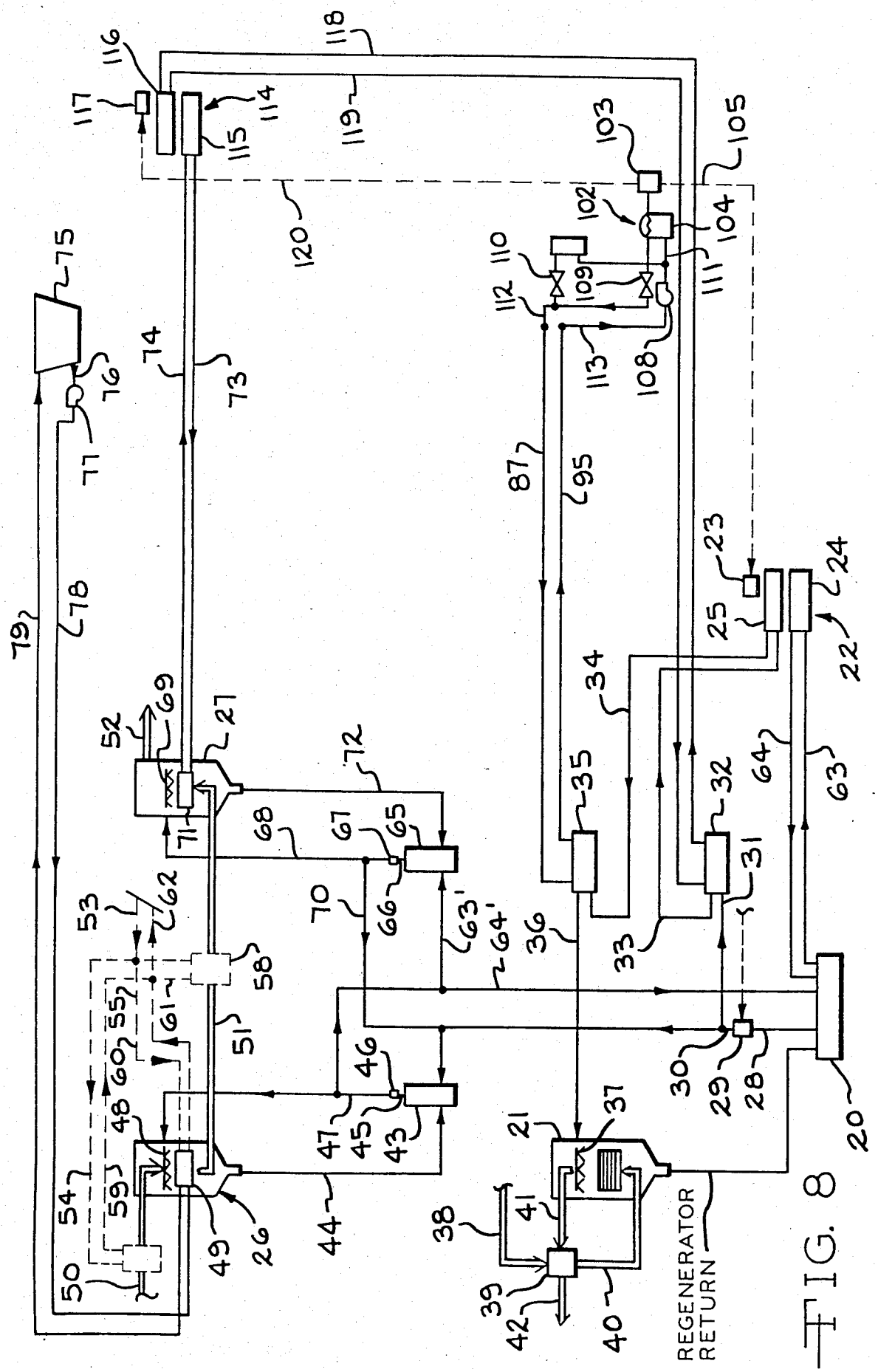
FIG. 8 is a partially schematic diagram showing apparatus similar to that of FIG. 6, with the exception that the solar collector has been eliminated.

The apparatus of FIG. 8 and its operation are substantially identical with those of the FIG. 6 apparatus with the exception that the solar collector 80, the storage tank 81 and associated piping and their functions have been eliminated.

Figure 9:
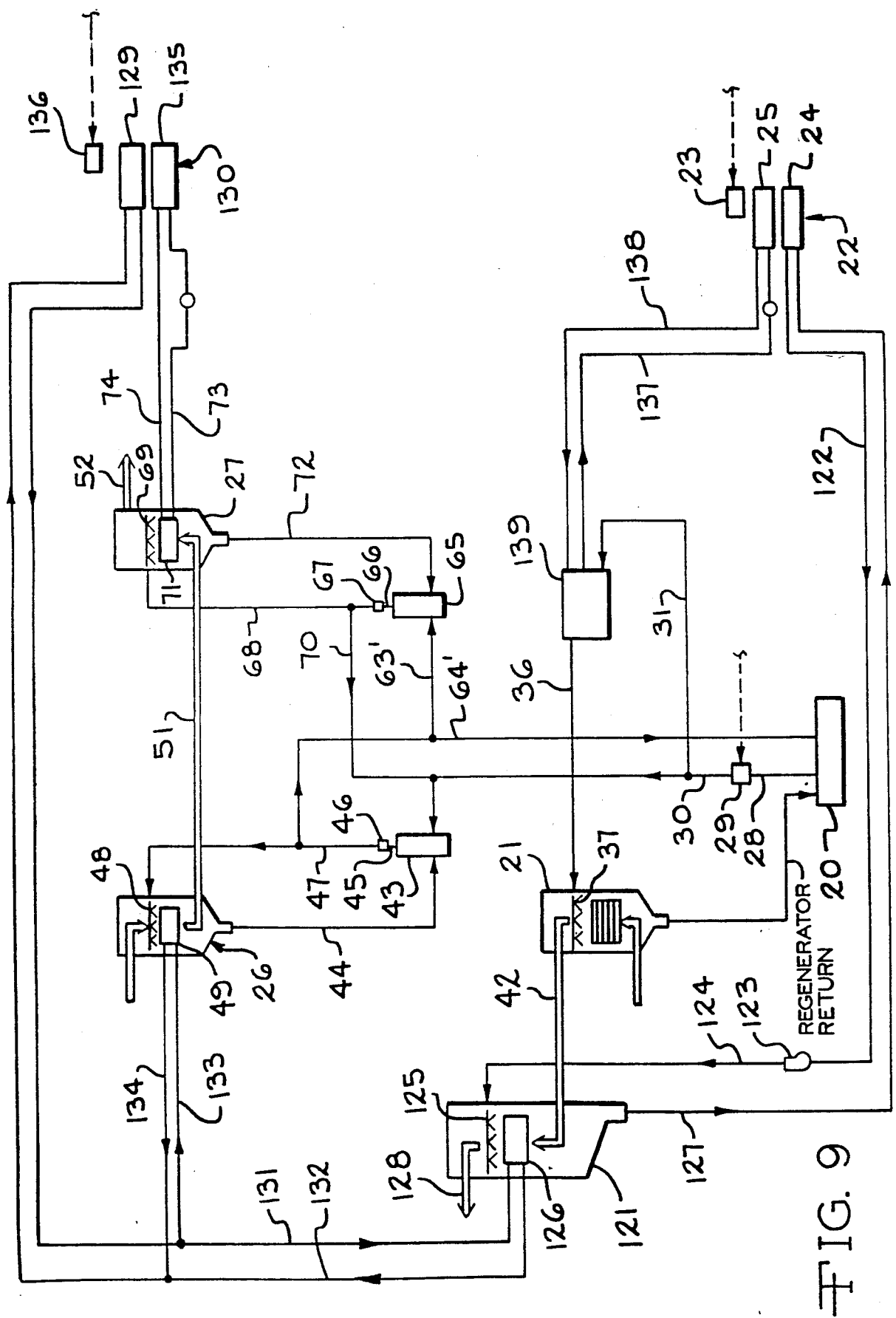
FIG. 9 is a partially schematic diagram of apparatus according to the invention wherein heat for regeneration of a hygroscopic solution is recovered in a washer from the hot, humid effluent from a regenerator; liquid from the washer is circulated to the heat absorbing section of a heat pump while heat for regeneration of the hygroscopic liquid is transferred thereto from the heat rejection section of the heat pump.

The apparatus shown in FIG. 9 is similar in many respects to that of FIG. 1, including the receiver 20, the regenerator 21, the heat pump 22 and the dehumidifiers 26 and 27, as well as all piping associated with the receiver 20, the regenerator 21 and the dehumidifiers 26 and 27 when both are used. In addition, the FIG. 9 apparatus includes a washer 121 to which water is circulated through a line 122 by a pump 123 and from thence through a line 124 to sprays within the washer 121. Water sprayed in the washer 121 from the sprays 125 comes into direct contact with hot, humid air which leaves the regenerator 21 through the line 42 and is discharged therefrom inside the washer 121. Water from the sprays 125 also comes into contact with an indirect heat exchanger 126, returning through a line 127 to the heat absorption section 24 of the heat pump 22. Both sensible heat and latent heat from the effluent from the regenerator 21 are transferred to the water sprayed in the washer 121 so that saturated air at a comparatively low temperature is discharged therefrom through a line 128.

Coolant is circulated to the indirect heat exchanger 126 from a condenser 129 of refrigeration apparatus 130 flowing to the coil 126 through a line 131 and returning the condenser 129 through a line 132. Coolant is also circulated from the line 131 to the indirect heat exchanger 49 of the dehumidifier 26, flowing thereto through a line 133, and returning to the line 132 through a line 134. Chilled water is circulated to the coil 71 of the dehumidifier 27 through the line 73 from an evaporator 135 of the refrigeration apparatus 130. A compressor of the apparatus 130 is designated 136.

Heat removed from the water circulated to the heat absorption section 24 of the heat pump 22 from water circulated thereto through the line 127 is transferred to water circulated to the heat rejection section 25 through a line 137 while hot water from the heat rejection section is circulated through a line 138 to an indirect heat exchanger 139 for heat transfer with hygroscopic solution circulated in the exchanger 139 through the line 31 and from thence through the line 36 to the sprays 37 of the regenerator 21.

Figure 10:
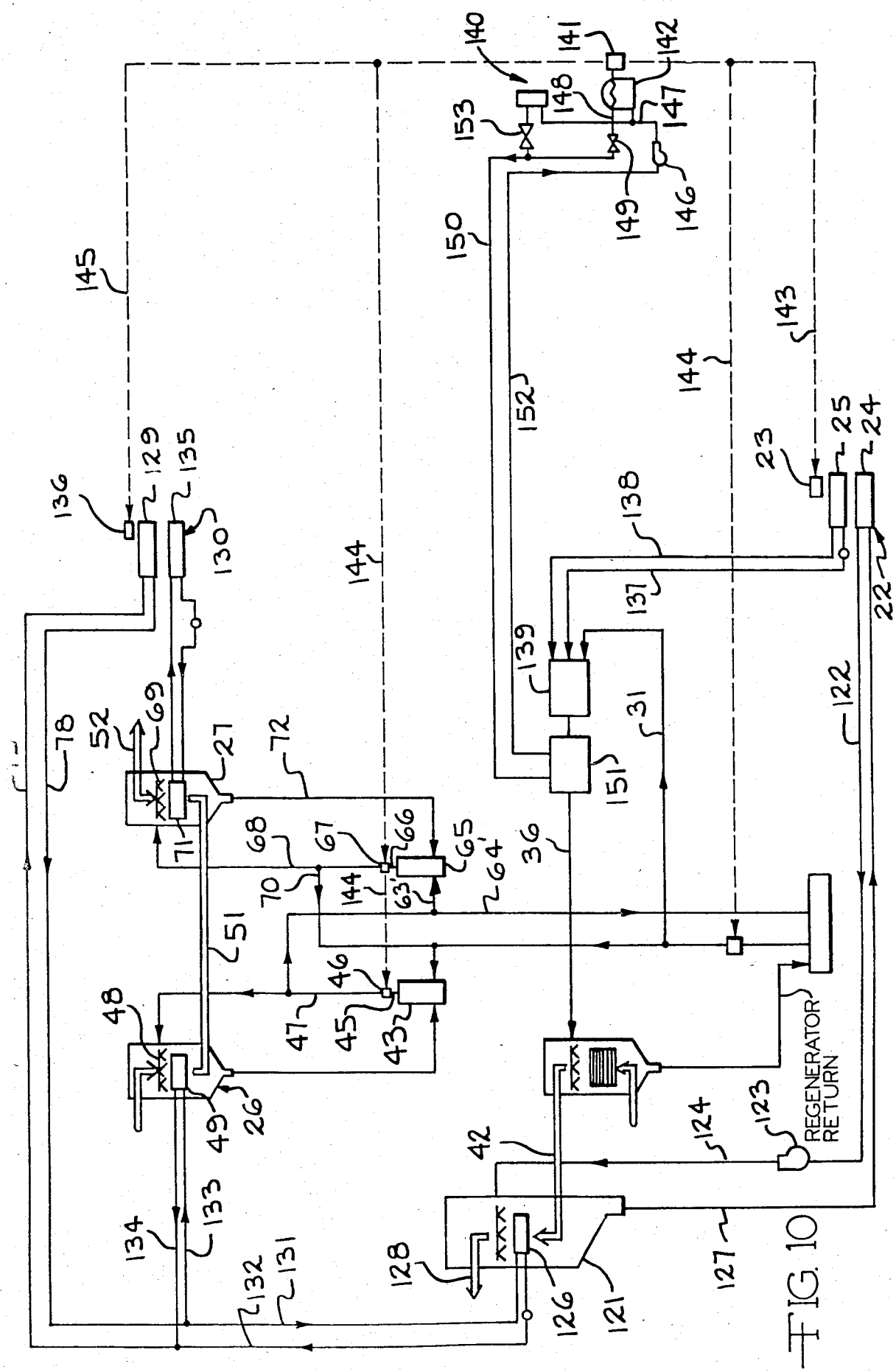
FIG. 10 is a partially schematic diagram similar to FIG. 9 but including, in addition, an electric generator to furnish electric energy for driving components of the apparatus and an internal combustion engine to drive the generator and to furnish a heated fluid and means for using that heated fluid in connection with the regeneration of a hygroscopic solution.
Figure 11:
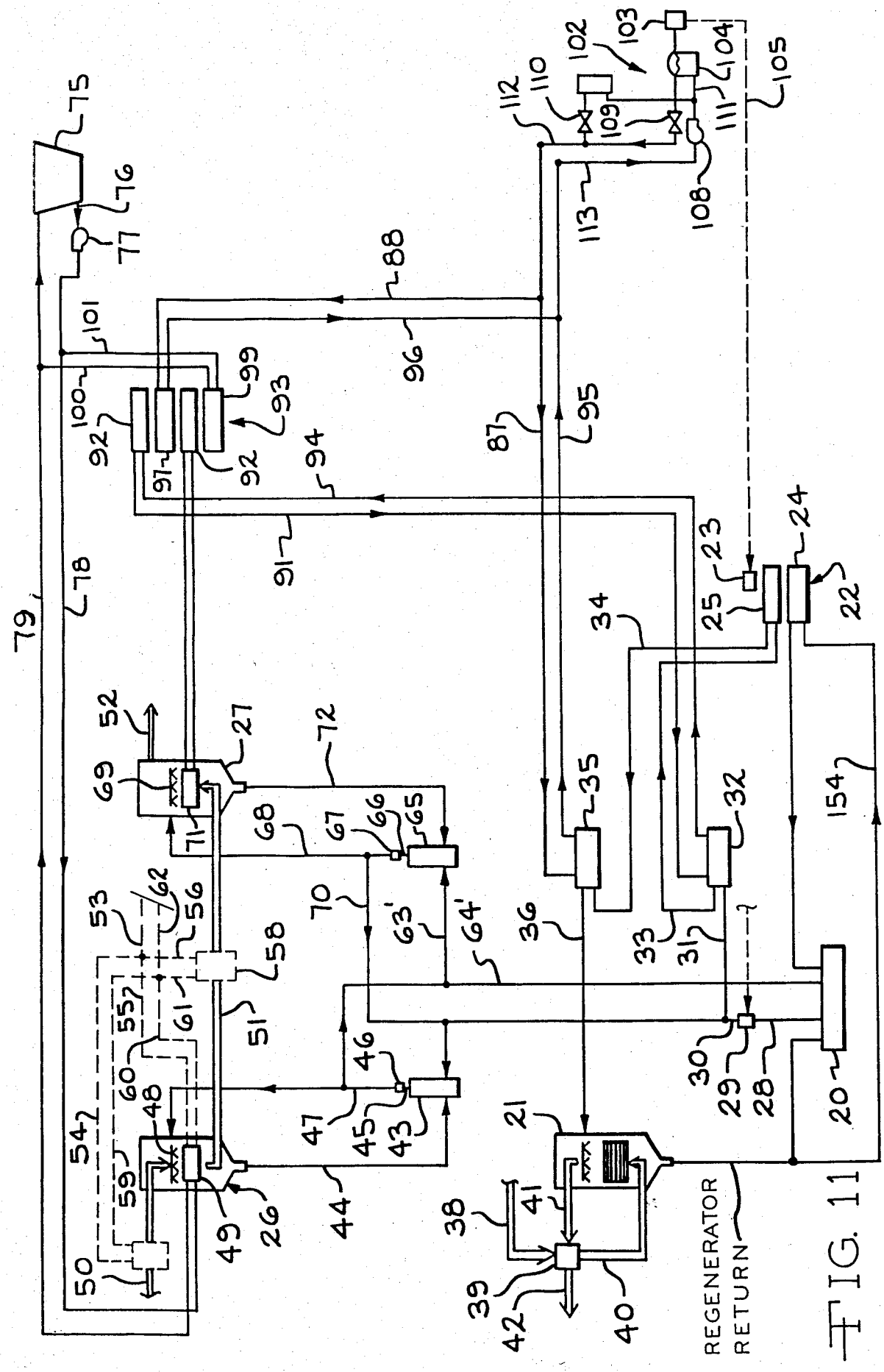
FIG. 11 is a partially schematic diagram showing apparatus according to the invention wherein a stream of a hygroscopic solution is caused to flow from a regenerator to the heat absorbing section of a heat pump and from thence to a receiver, while heat is transferred from the heat rejecting section of the heat pump to hygroscopic solution being caused to flow to the regenerator for regeneration.

The apparatus shown in FIG. 10 includes all of the elements shown in FIG. 9 and, in addition, a motor generator indicated generally at 140 and associated lines for coolant flow, valves and the like, as explained hereinafter. The motor generator 140 comprises a generator 141 and an internal combustion engine 142 operatively connected in driving relationship therewith. Power from the generator 141, as indicated by a dashed line 143 is supplied to the heat pump 22, as indicated by dashed lines 144 is supplied to the pumps 29, 46 and 67, and, as indicated by a dashed line 145, is supplied to the compressor 136. Coolant is circulated to the internal combustion engine 142 by a pump 146 through a line 147 and from thence through a line 148, an open valve 149 and a line 150 to an indirect heat exchanger 151. Coolant is returned from the indirect heat exchanger 151 to the pump 146 through a line 152. In the mode of operation of the apparatus of FIG. 10 just described, a valve 153 is closed.

The heat pump 22 can be, for example, one of the type which is commercially available from Westinghouse under the trade designation "Templizer". Such a heat pump can be used efficiently to absorb heat at a comparatively high temperature, for example in the vicinity of 100° F., and to reject heat at a temperature about 90° F. higher than the temperature of absorption. Accordingly, in the FIG. 9 apparatus, the amount of heat that can be removed in the washer 121 is limited because the heat absorbing section 24 of the heat pump 22 must operate at a temperature sufficiently high that the heat rejection section 25 is capable of heating hygroscopic solution in the indirect heat exchanger 139 to a temperature sufficiently high to enable regeneration. The FIG. 10 apparatus is not so limited because the coolant from the internal combustion engine 142 is used in the indirect heat exchanger 151 to heat the hygroscopic solution discharged from the indirect heat exchanger 139 where it has been heated by heat exchange with liquid from the heat pump 22. Accordingly, in the apparatus of FIG. 10, the heat absorbing and heat rejection sections, 24 and 25, of the heat pump 22 can be operated at lower temperatures than is possible in the apparatus shown in FIG. 9 and even more sensible and latent heat can be recovered in the washer 121.

Figure 12:
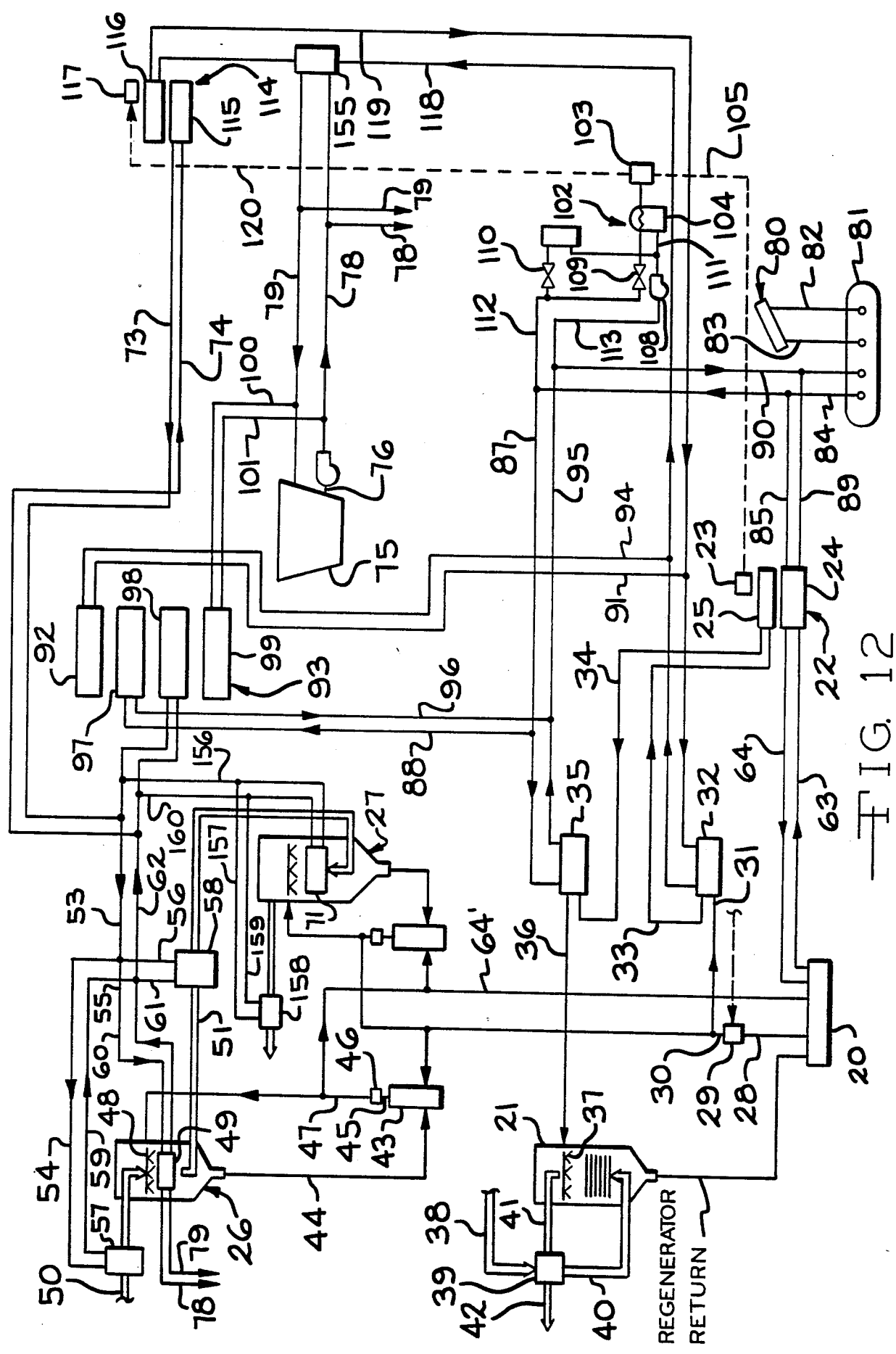
FIG. 12 is a partially schematic diagram similar to FIG. 6, and showing a combination according to the invention which is particularly advantageous when extremely dry but comparatively warm air is required.

Referring to FIG. 12, apparatus similar to that shown in FIG. 6, including the receiver 20, the regenerator 21, the dehumidifier 26, the dehumidifier 27, the heat pump 22, the indirect heat exchangers 32 and 35, the motor generator 102, the refrigeration apparatus 114 and the cooling tower 75 is disclosed. The apparatus of FIG. 12 differs from that of FIG. 6 in also including the absorption refrigeration apparatus 93 (see FIG. 1, for example) and in that a heat exchanger 155 has been added in the return line 118 to the condenser 116 of the refrigeration apparatus 114, the lines 53 and 62 have been connected to the evaporator 98 of the absorption apparatus 93, and to the lines 73 and 74, and the lines 78 and 79 have been connected to serve the heat exchanger 155.

The apparatus of FIG. 12 is peculiarly advantageous for use in supermarkets which have open display cabinets for frozen foods. Often, in such markets, heat is absorbed by the display cabinets at a rate adequate to maintain a sufficiently low temperature during seasons when comfort conditioning apparatus would otherwise be employed. It has been found that such heat absorption is highly inefficient from the standpoint of energy conservation, particularly because of frosting on the coils of the display cabinets. The apparatus of FIG. 12 can be used to dehumidify to a low grain air circulated to a supermarket. The dehumidification can be accomplished, in part, by the coil 57 and, in part, by one or both of the dehumidifiers 26 and 27. Chilled water from the evaporator 115 of the refrigeration apparatus 114 is circulated through the line 73 to the line 53 and, in parallel, from the evaporator 98 of the absorption apparatus 93 to the line 53, and returns from the line 62 to the evaporator 98 and, in parallel, through the line 74 to the evaporator 115. Chilled water which enters the line 53 can be circulated as previously described to the coil 57, to the coil 49 or to the coil 58, or can be circulated through lines 156 and 157, respectively, to the coil 71 or to a coil 158, returning the line 62 through lines 159 and 160. As in the apparatus of FIG. 1, for example, water from the cooling tower 75 can also be circulated through the lines 78 and 79 to the coil 49; in order to avoid unnecessarily complicating the drawing, the connection necessary for such circulation has not been shown, but is merely represented by arrows on the respective lines adjacent the tower 75 and adjacent the coil 49.

The following Examples are illustrative of the operation of the FIG. 12 apparatus, and demonstrate that it can be operated under varying conditions to make optimum use of electrical energy, fuel or both. All energy relationships are given on a Btu per pound of dry air circulated basis. The use of solar energy is not contemplated in the following Examples.

According to a first Example, one pound per hour of outside air entering the line 50 at a dry bulb temperature of 95° F., specific humidity 120 grains, can be dehumidified in the dehumidifier 26 so that it leaves at a dry bulb temperature of 95° F., specific humidity 56 grains, and can then be further dehumidified and cooled in the dehumidifier 27 to a dry bulb temperature of 65° F., specific humidity 32 grains. In this mode of operation, water from the tower 75 is circulated to the coil 49, while chilled water from the evaporator 115 is circulated to the coil 71; the coils 57, 58 and 158 are not used. In this mode of operation, the system removes, on the stated basis, 12 Btu of heat from the coil 71 and furnishes 26 Btu to accomplish regeneration. The energy required to remove 12 Btu from the coil 71 can be furnished by 6 Btu of shaft work from the engine 104, thus making 6 Btu from the cooling jacket (not illustrated) of the engine 104 available at the heat exchanger 35. Removing 12 Btu of heat from the coil 71 (by transfer to the evaporator 115 and heat pumping to the condenser 116) makes 18 Btu available at the heat exchanger 31. Accordingly, in this mode of operation, the total heat available for regeneration is 24 Btu, a slight insufficiency. This slight deficiency can be overcome by shifting a part of the load from the dehumidifier 26 to the dehumidifier 27, for example by decreasing the rate at which cooling water is circulated to the coil 49. Since, in the mode of operation just described, there is no excess heat available, the absorption apparatus 93 is not energized.

The same dehumidification and cooling can be accomplished by circulating chilled water to the coil 57 and to the coil 49 without using the dehumidifier 27 or circulating cooling water to any of the coils 58, 71 and 158. This can be accomplished by circulating chilled water at 55° F. to the coils 57 and 49 so that the air at 95° F., specific humidity 120 grains, entering the line 50 is cooled to 65° F., specific humidity of 85 grains, in flowing across the coil 57, and is dehumidified to a specific humidity of 32 grains at 65° F. in dehumidifier 26. In this mode, the apparatus removes 22 Btu from the coils 57 and 49, and while 26 Btu are required for regeneration of the desiccant. Heat pumping 22 Btu from the coils 57 and 49 by the refrigeration apparatus 114 will make 33 Btu available at the condenser 116 and at the heat exchanger 32. Accordingly, there is an excess of heat available even if the apparatus 114 is driven by electricity from a utility, rather than by the motor generator 102. Accordingly, in this mode, when the motor generator 102 is not used, excess heat available at the condenser 116 (above that required at the heat exchanger 32 for desiccant regeneration) is transferred to the concentrator 97 of the absorption apparatus 93 (the lines necessary to accomplish this transfer are not shown in FIG. 12). Preferably, however, in this mode, the motor generator 102 furnishes the electrical energy required to operate the apparatus 114 and heat from the cooling jacket of the internal combustion engine 104 is divided between the concentrator 97 of the absorption apparatus 93 and the heat exchanger 35 so that the heat transfer required for cooling is partialy to the evaporator 98 of the absorption apparatus 93 and partially to the evaporator 115 of the apparatus 114.

When outside air entering the line 50 is at a dry bulb temperature of 65° F., specific humidity 85 grains, this air can be dehumidified (all that is required), for example in the dehumidifier 26, circulating 55° F. water thereto, and not using any of the coils 57, 58, 71 and 158 or the dehumidifier 27. This requires the removal of 9 Btu from the coil 49 and 18 Btu for desiccant regeneration. Operating the motor generator 102 to provide electrical energy for the apparatus 114 requires, on the indicated basis, 4½ Btu of shaft work and makes 4½ Btu available at the heat exchanger 35. Since the energy heat pumped to the condenser 116 of the apparatus 114 amounts to 13½ Btu, the system is in balance without operation of the absoprtion apparatus 93.

It is preferred to operate the apparatus of FIG. 12 so that the heat available substantially equals that required for desiccant regeneration. The heat exchanger 155 is provided only for the rejection of excess heat in order to avoid a temperature increase within the system.

Although the apparatus of FIG. 12 has been described without reference to the use of heat from the solar collector 80, it will be appreciated that such heat, if any is available, can be used in the manner previously described to reduce the energy requirements even further, for example by circulating hot water collected in the storage tank 81 to supply heat for regeneration, by circulation to the exchanger 35 or the heat absorbing section 24, depending on the temperature therein. Similarly, the apparatus of FIG. 12 can be modified to use air discharged from the regenerator 21, heat of sorption or both as a heat source for the heat pump 22 (see FIG. 10) or to use a stream of regenerated desiccant leaving the regenerator 21 as a heat source for the heat pump 22 (see FIG. 11).

Figure 13:
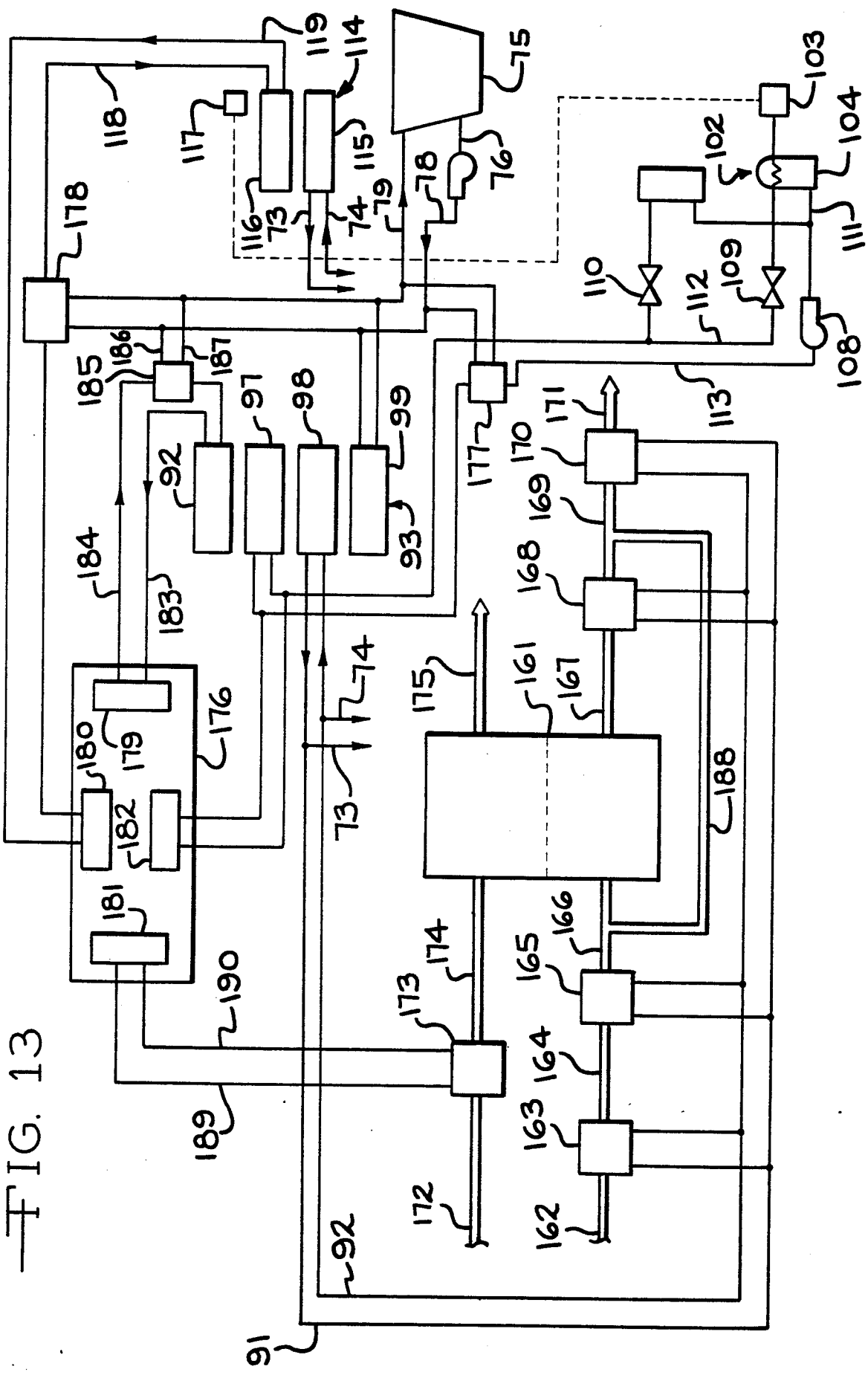
FIG. 13 is a partially schematic diagram of apparatus functionally similar to that shown in FIG. 12.

The apparatus of FIG. 13 is functionally similar to that of FIG. 12, but uses a solid desiccant dehumidifier 161 rather than one or both of the dehumidifiers 26 and 27. The dehumidifier 161 is of a known type, for example that available under the designation "Honey Combe" desiccant dehumidifier, which includes a rotatable sectored wheel comprising a support impregnated with lithium chloride or a molecular sieve. The dehumidifier 161 can also be of the batch type in which a solid desiccant such as silica gel or activated alumina is used. Air to be dehumidified enters the apparatus through a line 162, and then flows through a heat exchanger 163, a line 164, a heat exchanger 165 and a line 166 to the dehumidifier 161. Dehumidified air leaves the dehumidifier 161 through a line 167, flowing through a heat exhcnager 168, a line 169, a heat exchanger 170 and a line 171 from whence it is delivered to a space to be conditioned.

Regenerating air enters the apparatus through a line 172, flowing through a heat exchanger 173 and a line 174 to the dehumidifier 161. Regenerating air leaves the dehumidifier 161 through a line 175 from which it is vented from the system.

The apparatus of FIG. 13 also includes the cooling tower 75, the absorption refrigeration apparatus 93, the motor generator 102 and the refrigeration apparatus 114, all previously described, and, additionally, a heat storage tank 176, heat exchangers 177, 178, 179, 180, 181 and 182 and associated piping, as subsequently described.

A coolant is circulated through the line 119 from the condenser 116 of the refrigeration apparatus 114 to the heat exchanger 180, returning through the line 118 and the heat exchanger 178 to the condenser 116. In this manner, heat pumped from the evaporator 115 to the condenser 116 is transferred to water or another heat transfer fluid in the storage tank 176, while heat is transferred, if necessary, in the heat exchanger 178 to heat transfer fluid circulated thereto through the line 78 and rejected from the system in the cooling tower 75 to avoid delivery of coolant to the condenser 116 from the line 118 at an excesssively high temperature. The cooling tower 75 is also connected, through the lines 78 and 79, to the condenser 99 of the absorption refrigeration apparatus 93 and to the heat exchanger 177 in the line 113; the former connection enables the removal of heat from the absorption refrigeration apparatus 93, while the latter enables the removal of heat, if necessary, from coolant returned to the combustion engine 104. Heat from the combustion engine 104 can be transferred by coolant circulated through the line 112 to the concentrator 97 of the absorption refrigeration apparatus 93 or, in parallel, to the heat exchanger 182, returning to the engine 104 through the line 113 and the heat exchanger 117. The condenser 92 of the absorption refrigeration apparatus 93 is connected by lines 183 and 184 to the heat exchanger 179 in the storage tank 176. This connection enables the transfer of heat from the condenser 92 to water or another heat transfer fluid within the tank 176. If necessary, excess heat can be transferred from coolant circulating through the line 184 in a heat exchanger 185 which is connected by lines 186 and 187 to the lines 78 and 79.

In operation, air enters the apparatus of FIG. 13 through the line 162, flowing through the heat exchanger 163, the line 164, the heat exchanger 165, the line 166, the dehumidifer 161, the line 167, the heat exchanger 168, the line 169, the heat exchanger 170 and, through the line 171 to a space to be air conditioned. Heat is transferred from the air so circulated by one or more of the heat exchangers 163, 165, 168 and 170 to cause sensible cooling, dehumidification, or both, as subsequently described in more detail. A portion of the circulated air is bypassed through a line 188 from the line 166 to the line 169, so that the bypassed air does not pass through the dehumidifier 161 or the heat exchanger 168. As is subsequently explained in more detail, the size of the dehumidifier 161 and the proportion of the circulated air bypassed through the line 188 are selected both to provide heat balance and to provide the desired combination of dry bulb temperature and humidity of air delivered to the space to be conditioned through the line 171.

The wheel of the dehumidifying apparatus 161 rotates slowly in operation to position successive segments so that air being treated, and entering through the line 166, passes therethrough and then so that regeneration air entering from the line 174 passes therethrough. The regenerating air is heated to a suitable temperature, as subsequently described in more detail, as it passes through the heat exchanger 173. Heat is transferred to the heat exchanger 173 by coolant circulated through lines 189 and 190 from the heat exchanger 181, so that the source for this heat can be the condenser 92 of the absorption refrigeration apparatus 93, the condenser 116 of the refrigeration apparatus 114, water from the cooling jacket of the engine 104, or a combination of these. Similarly, coolant for one or more of the heat exchangers 163, 165, 168 and 170 is circulated thereto through lines 91 and 92 from the evaporator 98, from the evaporator 115, or from both.

The following Examples are illustrative of the operation of the apparatus of FIG. 13, and demonstrate that it can be operated under varying conditions to make optimum use of fuel or of electricity from a utility. All energy relationships and material balance data are given on the basis of 1000 cubic feet of air entering the line 162.

According to a first Example of the apparatus of FIG. 13, and its operation, air enters the lines 162 and 172 at a dry bulb temperature of 75° F., specific humidity 85 grains; the heat exchanger 165 is operated so that air entering the line 166 has a dry bulb temperature of 52° F. and a specific humidity of 56 grains; the wheel of the dehumidifier 161 is sized to accommodate a flow of 466 cubic feet of air from the line 166 and a flow of 466 cubic feet of regenerating air from the line 174; the heat exchanger 173 is operated to heat entering air to 135° F. dry bulb temperature, specific humidity 85 grains. The heat exchangers 163, 168 and 170 are not used.

According to the first Example, the air entering the lines 162 and 172 has an enthalpy of 32.2 Btu per pound of dry air. After this air has been cooled and dehumidified in the heat exchanger 165, the enthalpy is 21.2 Btu per pound of dry air. Of this cooled and dehumidified air, 534 cubic feet are bypassed through the line 188, while the remaining 466 cubic feet are circulated through the dehumidifier 161, leaving at a dry bulb temperature of 93° F., specific humidity 6 grains. The mixture of dehumidified air and air bypassed through the line 188 which is delivered from the line 171, then, has a dry bulb temperature of 75° F., specific humidity 32.7 grains. When operated as described, the heat exchanger 165 removes 44,500 Btu from the air circulated therethrough, while the heat exchanger 173 adds 30,200 Btu to the air circulated therethrough. Since the refrigeration apparatus 114, if operated so that the evaporator 115 absorbs 44,500 Btu in a given period of time, will make available 66,750 Btu at the condenser 116, the apparatus will provide a large excess of heat, over that required for desiccant regeneration, if the refrigeration apparatus is powered by electricity from a utility. By comparison with other expedients, however, such operation of the apparatus is often highly advantageous. The motor generator 102, the absorption refrigeration apparatus 93, the storage tank 176 and the heat exchangers 179, 180, 181 and 182 can then be eliminated and the lines 118 and 119 connected directly the lines 189 and 190 so that heat is transferred directly from the condenser 116 to the heat exchanger 173. Excess heat, beyond that required for desiccant regeneration, is then removed at the heat exchanger 178, and rejected from the system by the cooling tower 75.

When the additional investment in equipment is warranted, and when suitable fuel is available, it is preferred to accomplish the Example 1 mode of operation using all of the apparatus shown in FIG. 13, powering the refrigeration apparatus 114 by electricity generated by the motor generator 102, using heat from the cooling jacket (not illustrated) of the engine 104 to power the absorption refrigeration apparatus 93, and dividing the refrigeration load between the absorption apparatus 93 and the apparatus 114 so that the heat available as a consequence of the combined refrigeration operation substantially equals that required for desiccant regeneration.

Examples of other ways in which the dehumidification portion of the apparatus of FIG. 13 can be operated to produce conditioned air at a dry bulb temperature of 75° F., specific humidity 32.7 grains, are set forth in Table I, below:

TABLE I

| Example | Entering air, dry bulb/specific humidity, grains | Device(s) used | Removal of heat from air Exiting air, dry bulb/specific humidity, grains | Air being conditioned cubic feet/dry bulb/specific humidity, grains Through line 167 | Through bypass 188 |
| --- | --- | --- | --- | --- | --- |
| 2 | 75° F./85 | Heat exchanger 165 | 60° F./69 | 650/102.5° F./13 | 350/60° F./69 |
|   |           | Heat exchanger 168 | 83° F./13 |                  |                |
| 3 | 75° F./85 | Heat exchanger 168 | 75° F./28 | 920/117° F./28   | 80/75° F./85   |
| 4 | 75° F./85 | Heat exchanger 165 | 52° F./56 | 466/91° F./6     | 534/52° F./56  |
| 5 | 95° F./120 | Heat exchanger 163 | 75° F./85 | 466/91° F./6    | 534/52° F./56  |
|   |            | Heat exchanger 165 | 52° F./56 |                 |                |
| 6 | 95° F./120 | Heat exchanger 163 | 80° F./84 | 920/117° F./28  | 80/80° F./84   |
|   |            | Heat exchanger 168 | 75° F./28 |                 |                |

Assuming that the entering air of Table I is delivered both to the line 162 and to the line 172 in Examples 2, 3, 4 and 5 and, in Example 6, that that entering air is delivered to the line 162 while relief air at a dry bulb temperature of 75° F., specific humidity 85 grains, is delivered to the line 172, the FIG. 13 apparatus, used as indicated in Examples 2 through 6, when regenerating air flows and temperatures are as indicated, has the thermal requirements set forth in Table II, below:

TABLE II

| Example | Heat Removal Equipment | Thermal Requirement | Heat Required At Exchanger 173 for Regeneration | Regenerating Air cubic feet/dry bulb/ specific humidity, grains In line 174 | In line 175 |
| --- | --- | --- | --- | --- | --- |
| 2 | Heat exchanger 165 and Heat exchanger 168 | 41,400 Btu | 47,000 Btu | 725/135° F./85 | 725/97° F./138 |
| 3 | Heat exchanger 168 | 41,300 Btu | 64,800 Btu | 1000/135° F./85 | 1000/97° F./138 |
| 4 | Heat exchanger 165 | 44,500 Btu | 35,100 Btu | 650/125° F./85 | 650/98° F./121 |
| 5 | Heat exchanger 163 and Heat exchanger 165 | 93,500 Btu | 35,100 Btu | 650/125° F./85 | 650/98° F./121 |
| 6 | Heat exchanger 165 and Heat exchanger 168 | 90,350 Btu | 64,800 Btu | 1000/135° F./84 | 1000/97° F./138 |

It will be appreciated from the foregoing data that the relationship between the amount of heat which must be removed and the amount of heat required for desiccant regeneration varies for the several embodiments represented by the foregoing Examples. However, in every case except Example 3, since the absorption of 1 Btu at the evaporator 115 liberates 1½ Btu at the condenser 116, there is an excess of heat over that required for regeneration if the refrigeration apparatus 114 is driven by electricity from a utility. Accordingly, the embodiment represented by Example 3 is slightly more efficient than the embodiments of Examples 1, 2 and 4, when electricity from a utility is used as the energy source. Similarly, the embodiment of Example 6 is more efficient than that of Example 5 when purchased electricity is used. Indeed, in this case, the optimum efficiency can be achieved by shifting load from the heat exchanger 165 to the dehumidifier 161; such shifting reduces the heat removal requirement at the heat exchanger 165 and increases the heat required at the exchanger 173 for regeneration. The limiting condition is one where the heat removal requirement is approximately two-thirds the heat required for regeneration.

In the foregoing calculations relative to the FIG. 13 apparatus variations in the specific volume (cubic feet per pound of dry air) attributable to changes in temperature, specific humidity or both have been neglected. Accordingly, as will be appreciated by one skilled in the heating, ventilating and air conditioning art, the data of the Examples should not be used in making design calculations where such changes cannot be neglected; they are, however, entirely adequate for the purpose of disclosing the present invention.

While pumps have been shown in some of the circulating circuits of the apparatus of FIGS. 1-13, they have not been shown in other such circuits, for example those which include the lines 63, 73, 91 and 118. One skilled in the art will know where omitted pumps, blowers and the like are required in the circuits of actual apparatus according to the invention.

It will be apparent that various changes and modifications can be made from the specific details of the invention as disclosed in the attached drawings and discussed in connection therewith without departing from the spirit and scope of the invention as defined in the appended claims. For example, the arrangement of FIG. 11 where hot, concentrated hygroscopic solution is circulated directly to the heat absorbing section 24 of the heat pump 22 or the arrangement of FIGS. 9 and 10 where the effluent from a washer which removes heat from the hot humid air discharged from the dehumidifier 21 is so circulated to the heat absorbing section 24, can be used with any of the other specific arrangements of apparatus shown in FIGS. 1-8.

What I claim is:

1. Apparatus for dehumidifying air, said apparatus comprising a receiver for a hygroscopic liquid, a regenerator, a dehumidifier, a heat pump having an energy input section, a heat collecting section and a heat rejection section, and operable, when said energy input section is energized, to transfer heat from said heat collecting section at a given temperature to said heat rejection section at a temperature higher than said given temperature, means for circulating a first stream of a hygroscopic liquid which is capable of being regenerated when indirectly heated by the heat rejection section of said heat pump from said receiver into heat transfer relationship with the heat rejection section of said heat pump and then to said regenerator, means for spraying hygroscopic liquid circulated in the first stream in said regenerator, means for circulating a second stream of hygroscopic liquid from said regenerator to said receiver, means for circulating a third stream of hygroscopic liquid from said receiver to said dehumidifier, means for spraying hygroscopic liquid circulated in the third stream in said dehumidifier, means for circulating a fourth stream of hygroscopic liquid from said dehumidifier to said receiver, means for transferring heat of sorption from the apparatus, means for circulating air to be dehumidified through said dehumidifier in contact with hygroscopic liquid therein, means for removing from said regenerator water vaporized from hygroscopic liquid therein, and means operatively associated with the heat absorbing section of said heat pump and effective to transfer heat thereto from the second stream of hygroscopic liquid.

2. Apparatus for dehumidifying air comprising, in combination, a dehumidifier which employs a desiccant, means for passing air to be dehumidified through said dehumidifier in contact with a thermally regenerable hygroscopic material whereby moisture is absorbed by the material and the air is dehumidified, and from said dehumidifier to a space to be conditioned, a regenerator for the hygroscopic material, means for passing air to and through said regenerator in contact with hygroscopic material therein and then from said regenerator, refrigeration means having a heat collecting section and a heat rejection section for transferring heat from air discharged from said regenerator to said heat rejection section, and means for transferring heat to said regenerator, said last-named means including means for transferring heat from the heat rejection section of said refrigeration means into regenerating relationship with the hygroscopic material in said regenerator whereby absorbed moisture is rejected from the apparatus.

3. Apparatus as claimed in claim 2 which additionally includes power means operable to energize said refrigeration means and to produce thermal energy, and wherein said means for transferring heat to said regenerator additionally includes means for transferring thermal energy from said power means into regenerating relationship with the hygroscopic material in said regenerator.

4. Apparatus as claimed in claim 3 wherein said power means includes an electric generator for energizing said refrigeration apparatus, and an internal combustion engine operatively connected to drive said generator.

5. Apparatus for dehumidifying air comprising, in combination, a dehumidifier which employs a desiccant, means for passing air to be dehumidified through said dehumidifier in contact with a thermally regenerable hygroscopic material whereby moisture is absorbed by the material and the air is dehumidified, and from said dehumidifier to a space to be conditioned, a regenerator for the hygroscopic material, means for passing air to and through said regenerator in contact with hygroscopic material therein and then from said regenerator, means for effecting heat transfer between air leaving said regenerator and air entering said regenerator, refrigeration means having a heat collecting section and a heat rejection section, said refrigeration means being operable to transfer heat from air leaving said regenerator to the heat rejection section, and means for transferring heat to said regenerator, said last-named means including means for transferring heat from the heat rejection section of said refrigeration means into regenerating relationship with the hygroscopic material in said regenerator whereby absorbed moisture is rejected from the apparatus, said refrigeration means being positioned to transfer heat from air leaving said regenerator from which heat has already been transferred by said means for effecting heat transfer between air leaving and air entering said regenerator.

6. Apparatus for dehumidifying air, said apparatus comprising a source for heat at a predetermined low temperature above ambient, a receiver for a hygroscopic liquid, a regenerator, a dehumidifier, a heat pump having an energy input section, a heat collecting section and a heat rejection section, and operable, when said energy input section is energized, to transfer heat from said heat collecting section at a given temperature to said heat rejection section at a temperature higher than said given temperature, means for circulating a first stream of a hygroscopic liquid which is capable of being regenerated when indirectly heated by the heat rejection section of said heat pump from said receiver into heat transfer relationship with the heat rejection section of said heat pump and then to said regenerator, means for spraying hygroscopic liquid circulated in the first stream in said regenerator, means for circulating a second stream of hygroscopic liquid from said regenerator to said receiver, means for circulating a third stream of hygroscopic liquid from said receiver to said dehumidifier, means for spraying hygroscopic liquid circulated in the third stream in said dehumidifier, means for circulating a fourth stream of hygroscopic liquid from said dehumidifier to said receiver, means for transferring heat of sorption from the apparatus, means for circulating air to be dehumidified through said dehumidifier in contact with hygroscopic liquid therein, means for removing from said regenerator water vaporized from hygroscopic liquid therein, and means operatively associated with the heat absorbing section of said heat pump and effective to transfer heat thereto from at least one of (a) a fifth stream of hygroscopic liquid circulated from said receiver and, after heat transfer therefrom to the heat absorbing section of said heat pump, back to said receiver, and (b) said heat source.

7. Apparatus as claimed in claim 6 wherein said means operatively associated with the heat absorbing section of said heat pump is effective to transfer heat thereto from both of (a) the fifth stream of hygroscopic liquid and (b) said heat source.

8. Apparatus as claimed in claim 5 which additionally includes power means operable to energize said refrigeration means and to produce thermal energy, and wherein said means for transferring heat to said regenerator additionally includes means for transferring thermal energy from said power means into regenerating relationship with the hygroscopic material in said regenerator.

9. Apparatus for dehumidifying air comprising, in combination, a dehumidifier which employs a desiccant, means for passing air to be dehumidified through said dehumidifier in contact with a thermally regenerable hygroscopic material whereby moisture is absorbed by the material and the air is dehumidified, and from said dehumidifier to a space to be conditioned, a regenerator for the hygroscopic material, means for passing air to and through said regenerator in contact with hygroscopic material therein and then from said regenerator, a solar collector, means including refrigeration apparatus having a heat collecting section and a heat rejection section for transferring heat from said solar collector to said heat rejection section, means for transferring heat to said regenerator, said last-named means including means for transferring heat from the heat rejection section of said refrigeration apparatus into regenerating relationship with the hygroscopic material in said regenerator whereby absorbed moisture is rejected from the apparatus, power means which includes an electric generator for energizing the refrigeration apparatus and an internal combustion engine operatively connected to drive said generator and operable to produce thermal energy, and wherein said means for transferring heat to said regenerator includes means for transferring thermal energy from said power means into regenerating relationship with the hygroscopic material in said regenerator.

* * * * *